United States Patent [19]

Greten

[11] 4,128,373

[45] Dec. 5, 1978

[54] CONTINUOUSLY OPERATING ROUGH OR FINISHING PRESS

[75] Inventor: Ernst Greten, Springe, Fed. Rep. of Germany

[73] Assignee: Bison-werke Bähre & Greten GmbH & Co. KG, Fed. Rep. of Germany

[21] Appl. No.: 837,573

[22] Filed: Sep. 28, 1977

[30] Foreign Application Priority Data

Dec. 16, 1976 [DE] Fed. Rep. of Germany ....... 2657040

[51] Int. Cl.[2] .......................... B29C 15/00; B30B 5/06; B24J 5/10

[52] U.S. Cl. ..................................... 425/371; 425/224

[58] Field of Search ............... 425/363, 364, 371, 372, 425/373, 224

[56] References Cited

U.S. PATENT DOCUMENTS 3,883,284 5/1975 De Mets .............................. 425/371

*Primary Examiner*—J. Howard Flint, Jr.

*Attorney, Agent, or Firm*—Craig & Antonelli

[57] ABSTRACT

A continuously operable rough or finishing press for the manufacture of panels such as, for example, chipboards, fiberboards and the like, which press includes two endless plate bands or belts arranged one above the other to define a material treatment path therebetween. The endless plate bands include a number of plate elements pivotally connected to each other with each plate element being provided at edges thereof with spaced recesses and projections. At least one groove is provided in a middle or center area of each of the plate elements and/or at least one groove is provided at the projections of each of the plate elements so as to minimize deformation of the plate elements and/or arching of the center portion thereof during an operation of the press.

36 Claims, 6 Drawing Figures

CONTINUOUSLY OPERATING ROUGH OR FINISHING PRESS

The present invention relates to a press arrangement and, more particularly, to a continuously operating rough or finishing press for the manufacture of panels such as, for example, chipboards, fiberboards, or the like, with two superimposed facing endless plate belts or bands travelling around polygonal rollers disposed one above the other and in a horizontal and parallel relationship to each other, each of the plate bands or belts including articulated plates provided, along their edges extending transversely to a direction of movement of each endless plate belt, with recesses and projections with at least one of the two endless plate belts being movable by pressure rollers which are at least partially drivable and which can be affected by variable pressure forces and with each endless plate belt being enveloped by an endless steel band.

Continuously operating presses of the afore-mentioned type have been proposed in, for example, U.S. Pat. Nos. 3,883,284 and 4,015,921, German Pat. No. 23 20 178 and USSR application No. 2,015,757/29-33. In the proposed presses, the recesses and the projections on the plate belt are shaped trapezoidal to triangular with adjacent plates being connected to each other over only an area of the lateral surfaces of the plates by guides arranged at about a depth of the recesses of adjacent plates. Additionally, a notch is provided on a free end of each projection and at a base of each recess with the projections and recesses being arranged such that at an inlet area of the press, the notches on the free ends of the projections of a following plate, as viewed in a direction of movement of the endless plate belt, engage with a notch at the base of the recesses of a leading plate.

One shortcoming of presses of the aforementioned type resides in the fact that the pressure rollers exert a considerably high pressure on the respective plates of the endless plate bands, which plates have a relatively small thickness so that, in time, permanent deformations occur in a central area of the plate by virtue of bending stresses, which stresses lead to an arching of a middle or center area of the respective plates.

By virtue of the occurrence of bending stresses and the arching of the plates of the endless plate bands, it is not always possible to produce chipboards, fiberboards or the like having a cross-sectional thickness which is substantially constant, but rather the thickness of the manufactured article is normally larger in a central area thereof than at the side or lateral edge areas.

In German Pat. No. 20 17 845, it is proposed to insert or provide safety or protection plates between the pressure rollers and the endless plate bands, which safety plates are formed of a wear-resistant and form-fast material and which are adjustable, in limited amounts, in a direction of travel of the endless plate bands. Additionally, means are provided for moving the adjusted safety plates back into a starting or initial position after passing through the press area. The safety or protection plates serve to prevent any considerable wear of the plates of the endless plate bands by the drivable rollers which they move. Moreover, the protection or safety plates minimize the occurrence of bending stresses in the respective plates of the endless plate band.

In the last-mentioned German Patent, it was also suggested to provide the protection plates with slots which extend at an inclination to longitudinal edges of the respective plates, with a transverse slot or slit being associated with each of the inclined slots. While this last-mentioned proposal has proven useful, one disadvantage thereof resides in the fact that it requires a relatively large quantity of material. A further disadvantage resides in the fact that, by virtue of the adjustment of the protective or safety plates with respect to the plates of the endless plate bands, a certain amount of wear must be considered and taken into account.

The aim underlying the present invention essentially resides in providing a press of the afore-mentioned type wherein deformations of a central area of the respective plates of the endless plate bands are minimized, if not completely avoided, without having to increase a thickness of the respective plates of the endless plate bands by, for example, applying protection or safety plates.

According to one advantageous feature of the present invention, the surface of the plates of the endless plate bands facing the pressure rollers are provided with grooves or notches at least in a middle area thereof. By virtue of the provision of the grooves or notches, it is possible to manufacture or produce chipboards, fiberboards, or the like which have a more uniform cross-sectional thickness as compared to constructions wherein plates of the endless plate band are not provided with grooves or notches.

Preferably, the grooves or notches are provided in a middle area of the endless steel bands which are also provided with projections and recesses. However, it is also possible in accordance with the present invention to provide grooves in the area of the projections.

According to further advantageous features of the present invention, the grooves or notches extend essentially parallel to each other and/or are inclined to the lateral edges of the respective plates and/or a direction of movement of the endless plate bands.

Moreover, according to the present invention, the grooves may be arranged in a middle area of the plates of the endless plate bands and also be arranged so that they cross or intersect whereby a plurality of the grooves may extend in a direction of movement of each of the endless plate bands, for example, inclined to the left, while another plurality of grooves extend at an inclination toward the right in a direction of the endless plate bands. Although the crossing or intersection points of the respective grooves may be arranged anywhere on the respective plates of the endless steel bands, preferably, the crossing or intersection points are arranged in a middle area of the plates so as to provide a symmetric arrangement of the respective grooves.

In accordance with yet further advantageous features of the present invention, the grooves may have an approximately semi-circular cross-section or a U-shaped cross-section with leg areas of the respective grooves being rounded off. However, it is also possible to provide grooves which have an approximately trapezoidal cross-sectional configuration.

Tests conducted with plates constructed in accordance with the present invention have indicated that extensive problems and shortcomings of the prior art may be solved or avoided by the arrangement of grooves and also the projections at a smaller distance from the base of the recesses than from the grooves at the free ends of the projections. By virtue of such an arrangement, not only will a permanent deformation of the plates by the pressure rollers in the area of the projections be minimized, if not avoided, but also a larger elasticity of the projections is also obtained so that the projections entering a press area under a relatively large entering angle do not cause impressions or indentations in the surface of the plates of the endless plate bands.

Even though one groove must be arranged in each projection of the plates of the endless plate bands, in accordance with yet another feature of the present invention, the grooves are arranged in the projection so as to extend at an inclination to an extension direction of the projection and the groove of an adjacent projection extends at an opposite direction.

Moreover, it is possible in accordance with the present invention to provide two grooves in each projection with the grooves intersecting or crossing at the same crossing point as the grooves provided in the middle or central area of the plates of the endless plate band, whereby the crossing point is effectively arranged in a middle area of an extension of each of the projections.

By arranging the crossing grooves in the middle area of each of the plates of the endless plate band, as well as also in the projections, according to yet another advantageous feature of the present invention, the grooves in the projection extend at a crossing angle which is different from the crossing angle of the grooves which cross themselves in the middle area of the plates.

While the notches or grooves provided in the plate of the endless plate band may have a relatively shallow depth, it has been found that it is more effective to increase the groove depth, that is, to provide a groove having a depth which is at least half as large as the thickness of the plates. Naturally, the grooves should not be made to a depth which would result in the breaking of the plates of the endless plate band from temperature stresses which would result by virtue of the occurring bending stresses and the use of heated presses. Satisfactory test results were obtained with plates of the endless plate band having grooves which had a depth which was half the thickness of the respective plates.

Accordingly, it is an object of the present invention to provide a continuously operating rough or finishing press which avoids, by simple means, the shortcomings and disadvantages encountered in the prior art.

A further object of the present invention resides in providing a continuously operating rough or finishing press which includes endless plate bands having projections thereon with deformations in the area of the projections being minimized, if not completely avoided.

A still further object of the present invention resides in providing a continuously operating rough or finishing press which minimizes, if not avoids, permanent deformations and archings of a central area of plates of an endless plate band.

Yet another object of the present invention resides in providing a continuously operating rough or finishing press for the manufacture of panels such as chipboards, fiberboards, or the like wherein the cross-sectional thickness of the manufactured articles is maintained substantially constant.

Another object of the present invention resides in providing endless plate bands for a continuously operating rough or finishing press which minimize the wear of the plates and decrease the occurrence of bending stresses and thermal stresses on the respective plates.

A still further object of the present invention resides in providing a plate construction for endless plate bands of a continuously operating rough or finishing press which is simple in construction and therefor inexpensive to manufacture.

An additional object of the present invention resides in providing a continuously operating rough or finishing press which functions reliably under all operating conditions.

These and other objects, features and advantages of the present invention will become more apparent from the following description when taken in connection with the accompanying drawings which show, for the purposes of illustration only, several embodiments in accordance with the present invention, and wherein.

Figure 1:
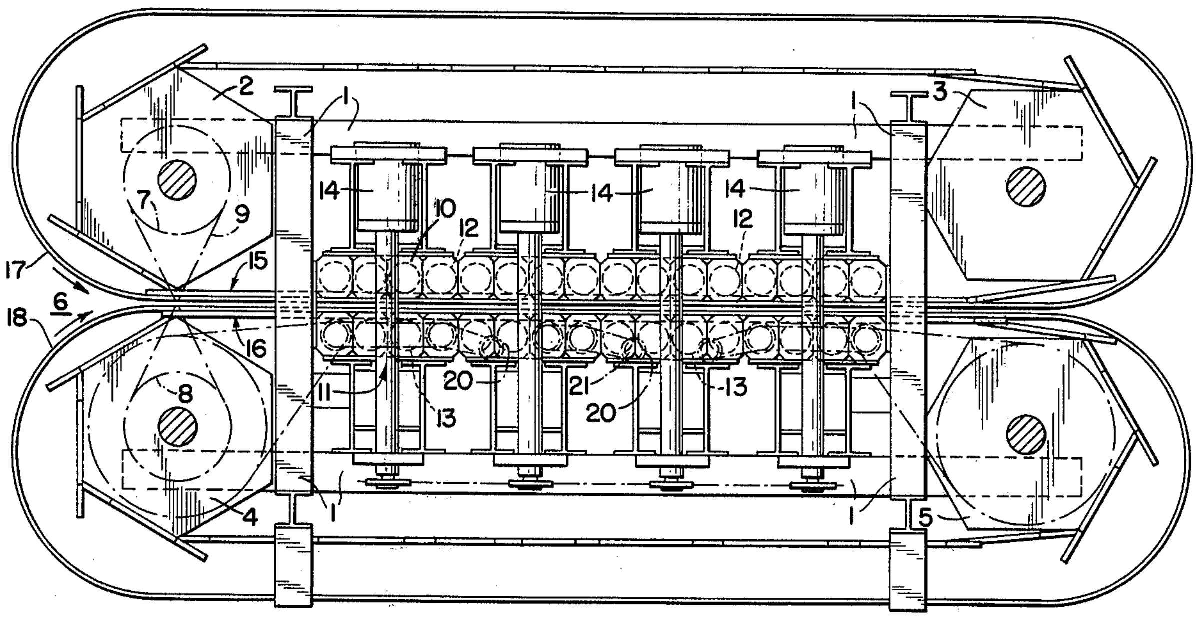
FIG. 1 is a schematic side view of a continuously operating press for producing fiberboards, chipboards and the like with plates fashioned in accordance with the present invention.

Referring now to the drawings wherein like reference numerals are used throughout the various views to designate like parts and, more particularly, to FIG. 1, according to this figure, a continuously operating press is provided which includes a frame 1 which supports, in the upper zone, two polygonal rollers 2, 3 and, in a lower zone, two polygonal rollers 4, 5. The rollers 4, 5 are arranged in bearings (not shown) and the rollers 2, 3 are mounted so as to be vertically adjustable. The two rollers 2, 4 disposed one above the other in an inlet zone 6 of the press are joined with each other by way of sprocket wheels 7, 8 and a chain 9 driven by a drive unit (not shown) via a slipping clutch at least during an idling of the press. Moreover, several groups generally designated by the reference numerals 10 and 11 of pressure rolls 12, 13 are disposed in the frame 1, of which the roll groups 10 can be selectively pressed against the roll groups 11 by means of hydraulic cylinders 14.

Two endless plate belts or bands generally designated by the reference numerals 15 and 16 and two endless steel belts or bands 17, 18, respectively surrounding the endless plate bands 15, 16, are disposed to travel between the groups 10, 11 of the pressure rolls 12, 13. The endless plate bands 15, 16 each consist of a plurality of plates which are connected with each other through guide elements in a manner more fully described hereinbelow.

Figure 2:
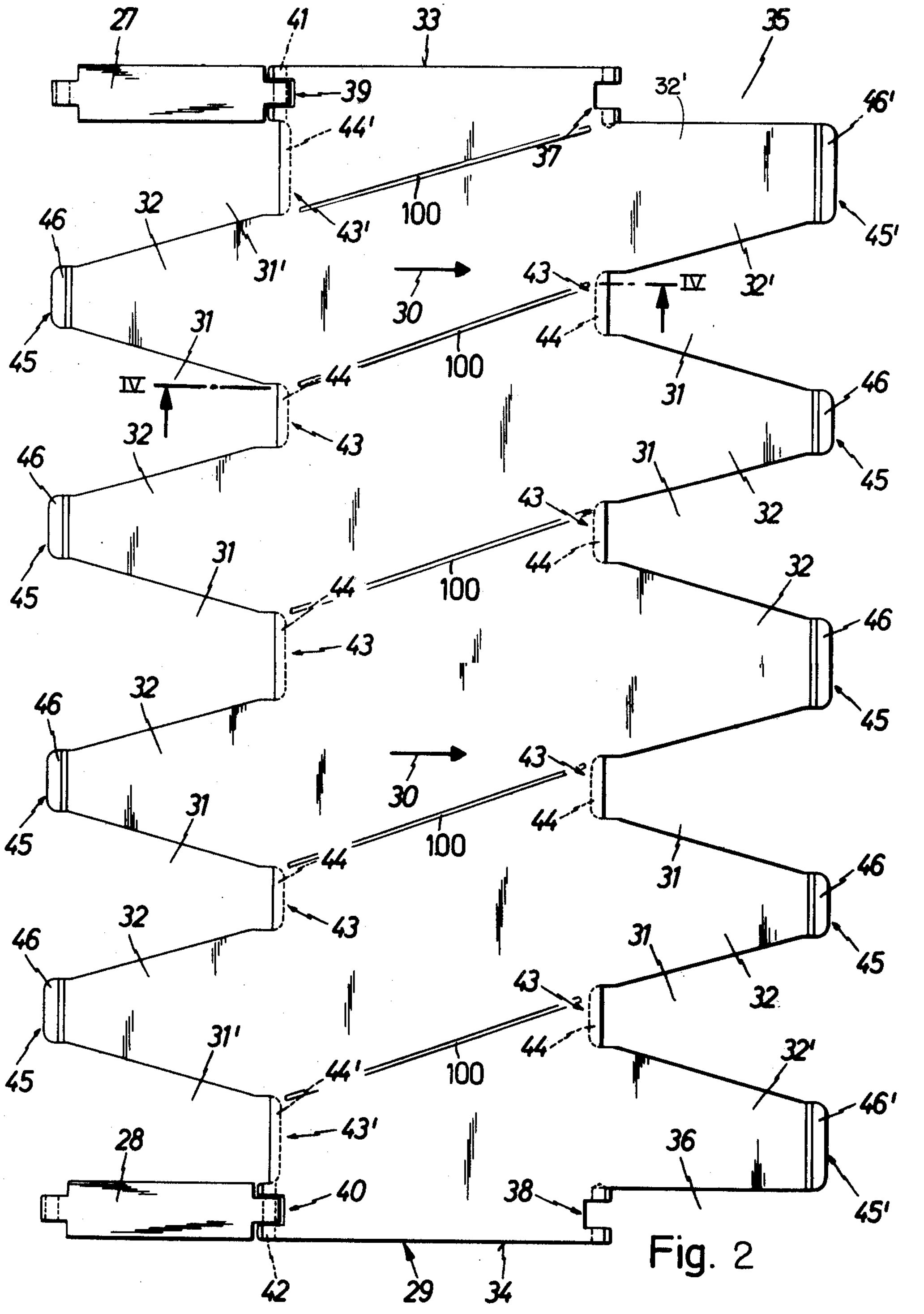
FIG. 2 is a top plan view of one of the plates constructed in accordance with one embodiment of the present invention.

As shown in FIG. 2, endless plate band element 29 is provided and is connected to additional endless plate elements (not shown) through guides 27, 28. The endless plate elements 29 are each provided with recesses 31 and projections 32 which extend across the respective plates transversely to the direction of movement indicated by the arrows 30. The recesses 31 and projections 32 are each shaped trapezoidally or triangularly.

Further rectangular recesses 35, 36 are provided on one side of each of the plates in an area of side surfaces 33, 34 with enlarged recesses 31' being provided at the other side at which the bearing points 37, 38, 39 and 40 are provided for the guides 27, 28, respectively.

Projections 32' are provided in an area of the side surfaces 33, 34, which latter projections have a different shape than the projections 32. If a plurality of plate elements 29 are connected with each other, the projections 32' engage in the recesses 31' and projections 32 engage in the recesses 31. Adjacent plate elements 29 are connected with each other in such a way that the guides 27, 28 are connected to adjacent plates by means of bolts 41, 42, respectively.

Each recess 31, 31' is provided in an area of its base 43, 43', respectively, with a notch 44, 44', respectively, which extends cross-wise to the direction of movement of the endless plate bands. Additionally, each projection 32, 32' is provided in the area of a free end 45, 45', respectively, with a notch 46, 46', respectively, each of which also extends transversely to the direction of movement of the endless plate band.

The depth of the notch 46, 46' of the projection 32, 32', as viewed in the direction of movement of the endless plate bands, is somewhat larger than the depth of the notch 44, 44', respectively, of the recesses 31, 31'.

Each notch or notch flap 44, 44', respectively, associated to a notch 46, 46' in the inlet zone 6 of the press corresponds to the notch flap 48 associated with one of the notches 44, 44' at the base of the corresponding recesses 31, 31', respectively, so that adjacent plates support themselves one against the other. The bolts 41, 42 which connect adjacent plates to the guide elements 27, 28 essentially only have the task of connecting the plates with each other with little, if any, stress being applied to the guide elements 27, 28.

Preferably, the plate elements 29 have a thickness of about 50 mm so that the weight of each of the individual plate elements 29 is considerably less than the weight of the plates used in conventional presses having recesses and projections shaped substantially rectangularly and requiring the use of additional safety or protection plates.

In accordance with the present invention, the surfaces of the middle area of the respective plate elements 29 facing the pressure rolls 12, 13 are provided with notches at least in a middle or central area of the plate elements with the notches extending essentially parallel to one another. With the notches arranged in such fashion, an extension thereof may run in a manner not illustrated parallel to the direction of movement of the plate elements of the endless plate band. However, the notches may also extend at an inclination to the parallel side edges of the plate elements or be inclined with respect to the direction of movement of the endless plate band in order to achieve the desired results.

Figure 4:
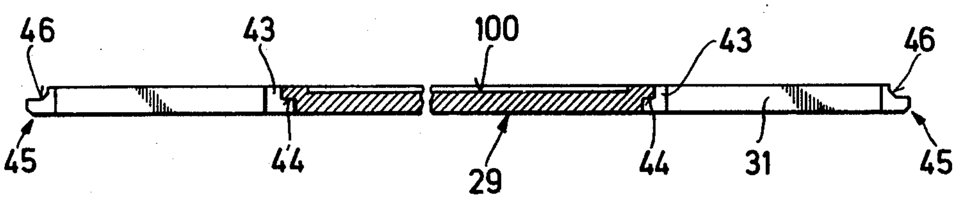
FIG. 4 is a cross-sectional view taken along the line IV—IV in FIG. 2.

As shown in FIG. 2, the notches 100 extend at an inclination to the direction of movement (arrow 30) of the plate elements of the endless plate band, that is, the notches 100 are inclined toward the left. The notches 100 as shown in FIG. 4 terminate ahead or before the recesses 31, that is, in an area of the corner of the recesses 31; however, such an arrangement is not absolutely necessary.

Advantageously, in order to decrease the notch stresses to a minimum, the notches preferably have a semicircular or a U-shaped cross-sectional configuration with leg areas of the respective notches being rounded off. Also, the legs of the U-shaped notches may diverge upwardly so that the cross-section of each notch assumes substantially a trapezoidal shape.

When the notches or grooves 100 illustrated in FIG. 2 extend in the direction of movement of the plate elements toward the left, they may also be arranged to extend in a direction of movement of the plate elements toward the right. Furthermore, the notches or grooves 100 of the plate elements 29 may extend also in opposite directions.

Figure 3:
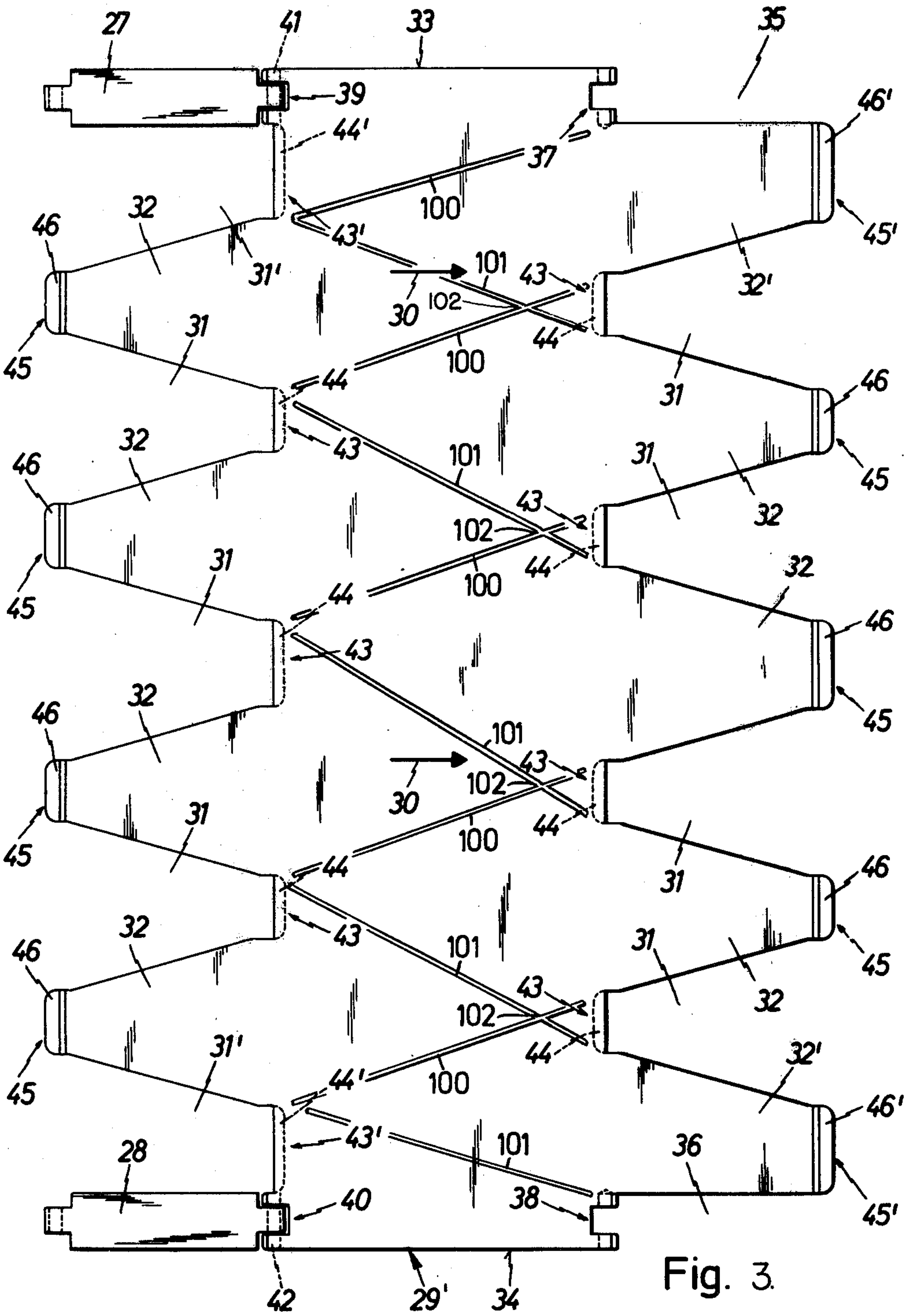
FIG. 3 is a top plan view of one of the plates constructed in accordance with a second embodiment of the present invention.

As shown most clearly in FIG. 3, a plate element 29' is provided which includes notches or grooves 100 and notches or grooves 101 with the notches 100 extending in the direction of movement of the plate elements (arrow 30) toward the left, and the notches 101 extending in a direction of movement of the plate elements 29' toward the right so that the notches 100, 101 intersect or cross each other. In the illustrated embodiment of FIG. 3, the crossing points 102 are arranged non-symmetrically in order to illustrate that the crossing points do not have to extend symmetrically to the recesses 31 even though a symmetric position of the crossing points is most effective and advantageous.

By virtue of the arrangement of the notches 100, 101, a split-up or breaking up of the surface results in the middle area of the plate elements 29' so that not only the bending stresses in the projections 32, 32' of the plate elements are decreased, but also the bending stresses in the central or middle area of the plate elements 29' are likewise decreased.

As readily apparent, the notches 100, 101 may be arranged in a manner different than that illustrated in FIG. 3 so as to decrease the bending stresses in the projections of the plate elements 29' as well as in the central area thereof.

Figure 5:
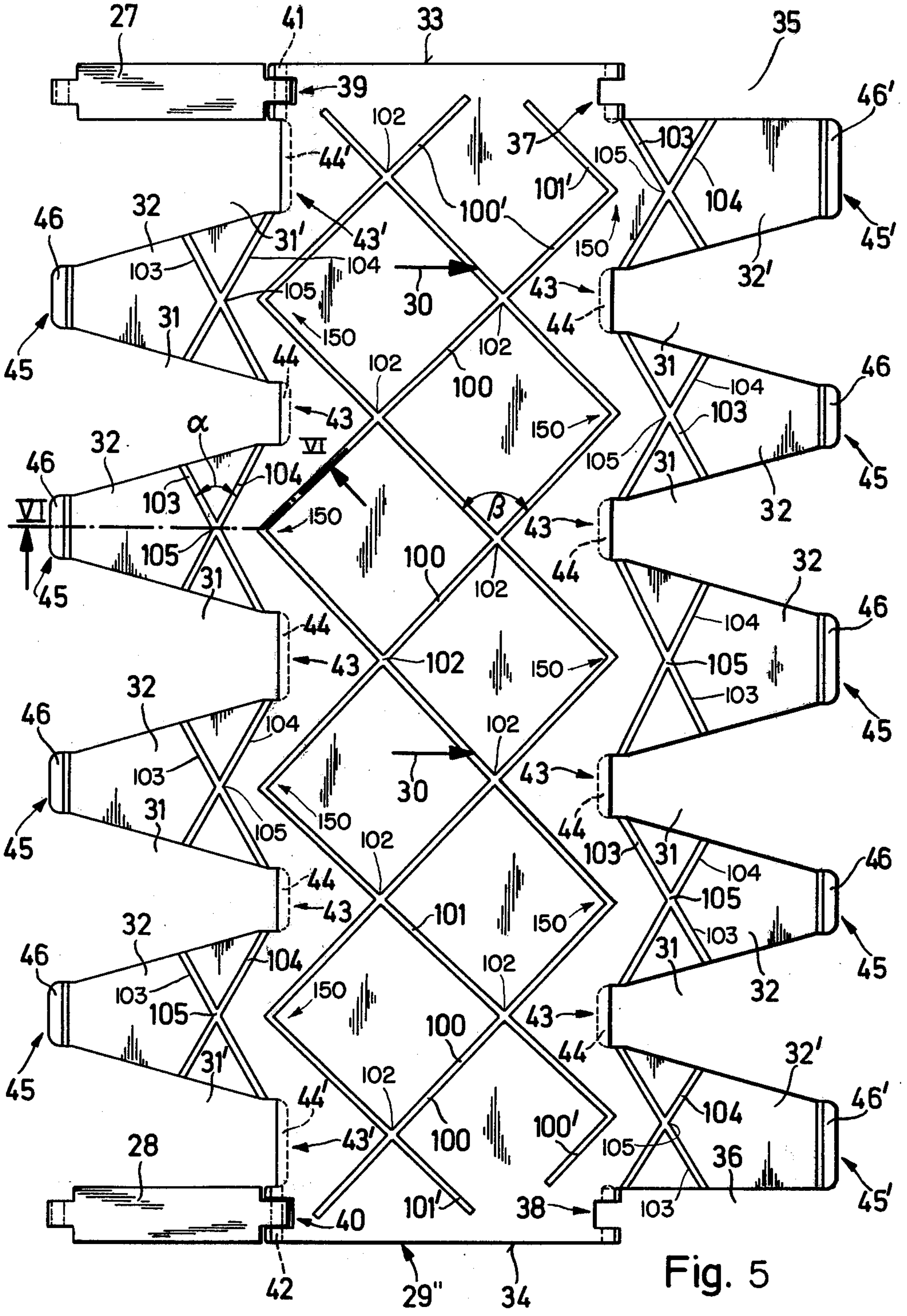
FIG. 5 is a top plan view of one of the plates constructed in accordance with a third embodiment of the present invention.

As shown in FIG. 5, a plate element 29" is provided which is joined to other plate elements so as to form an endless plate belt or band by guide elements 27, 28 which are provided in an area transverse to the direction of movement (arrow 30) of the endless plate band with recesses 31 and projections 32 which are respectively shaped trapezoidally or rectangularly.

In the belt construction of FIG. 5, further rectangular recesses 35, 36 are provided on one of the sides in an area of the side surfaces 33, 34 and larger recesses 31' are provided on the other side of the plate element 29" with the recesses 35, 36, 31' each being provided with bearing points 37, 38, 39, 40, respectively, for the guide elements 27, 28.

The projections 32' provided in an area of the side surfaces 33, 34 have a configuration which differs from that of the configuration of the projections 32. If a number of plate elements 29" are connected to one another, the projections 32' engage with the recesses 31' and the projections 32 engage with the recesses 31. Adjacent plate elements are connected with each other with the guides 27, 28 being attached through bolts 41, 42, respectively, at the adjacent plate elements 29".

Each recess 31, 31', respectively, is provided in the area of an associated base 43, 43' with a notch 44, 44', respectively, which notch extends transversely to the direction of movement of the endless plate bands. Additionally, each projection 32, 32', respectively, is provided in an area of free ends 45, 45', respectively, with a notch 46, 46' which also extends cross-wise or transverse to the direction of movement (arrow 30) of each endless plate band.

The depth of the notch 46, 46' of the projections 32, 32', respectively, as viewed in a direction of movement of the endless plate band is somewhat larger than the depth of the notch 44, 44', respectively, of the recesses 31, 31', respectively.

Each notch or notch flap 45, 45' associated with notches 46, 46', respectively, correspond to the notch or notch flaps 44, 44' associated with the bases of the recesses 31, 31', respectively, of adjacent plate elements 29" so that the adjacent plate elements 29" mutually support themselves. The bolts 41, 42 which connect the adjacent plate elements 29" with each other through the guide elements 27, 28 thereby function only to connect the plate elements one to the other with the connection being subjected to little, if any, stress.

In the middle or central area of each plate element 29", grooves 100 and 101 are arranged and inclined to the parallel lateral edges 33, 34 with the grooves 100, 101 intersecting or crossing. In the direction of movement of the plate elements 29", the grooves 100 extend inclined to the left and the grooves 101 extend inclined to the right. The grooves 100, 101 not only cross or intersect, but also meet and terminate in about the middle or central longitudinal areas generally designated by the reference numeral 150 of the projections 32, 32', whereas outer grooves 100', 101' terminate ahead or at a position spaced from the side surfaces 33, 34.

Grooves 103, 104 are provided in the respective projections 32, 32' with the grooves 103, 104 crossing or intersecting at points 105. The grooves 103, 104 are arranged at the projections 32, 32' such that their respective crossing points 105 are disposed at a smaller distance or nearer to the bases 43, 43' of the recesses 31, 31' than from the notches 46, 46' of the free ends 45, 45' of the projections 32, 32'.

The crossing or intersecting grooves 103, 104 define predetermined angles $\alpha$, whereas the crossing grooves 100, 101 define at their crossing points 102 a predetermined angle $\beta$, with the angles $\alpha$ and $\beta$ having different values. Preferably, the angles $\alpha$ are smaller than the angles $\beta$.

Figure 6:
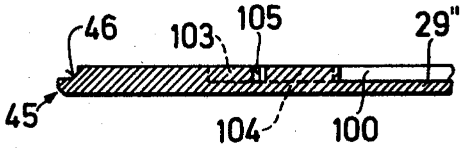
FIG. 6 is a partial cross-sectional view taken along the line VI—VI of FIG. 5.

As shown most clearly in FIG. 6, the depth of the grooves 100, 101, 103, 104 is somewhat larger than half of the thickness of the plate elements 29". As apparent, the grooves 100, 101 may be made with a different depth than the grooves 103, 104. Moreover, the grooves 100, 101, 103, 104 may be arranged in a different fashion so as to achieve the desired characteristics of the plate elements 29" of the endless plate band.

Moreover, it is possible in accordance with the present invention to provide notches 100, 101, 100', 101', 103 and 104 which have only a relatively shallow depth, which depth may be, for example, about one-fifth of the thickness of the respective plate elements 29, 29', 29".

Furthermore, while the drawings illustrate the recesses and projections as having a trapezoidal configuration, it is understood that the foregoing description is also applicable to plate elements of an endless plate band having recesses and projections which have a rectangular cross-sectional configuration.

While I have shown and described several embodiments in accordance with the present invention, it is understood that the same is not limited thereto, but is susceptible of numerous changes and modifications as would be known to those skilled in the art to which it pertains, and I therefor do not wish to be limited to the details shown and described herein, but intend to cover all such changes and modifications as are encompassed by the scope of the appended claims.

I claim:

1. An endless band arrangement for a continuously operating rough or finishing press, the arrangement comprising: a plurality of individual plate elements, means for pivotally connecting the plate elements to each other to form an endless plate band, and means provided in at least one surface of each of said plate elements for minimizing deformation of the plate elements during an operation of the press.

2. An arrangement according to claim 1, wherein said means for minimizing deformation of the plate elements are arranged at least in a middle area of each of the plate elements.

3. An arrangement according to claim 2, wherein said means for minimizing deformation of the plate elements includes at least one groove provided in a surface of the respective plate elements facing pressure rollers of the press.

4. An arrangement according to claim 3, wherein a plurality of grooves are provided on each plate element, each of said grooves being arranged on the surface of each of said plate elements so as to extend substantially parallel to each other.

5. An arrangement according to claim 4, wherein the plate elements include spaced parallel side edges, and wherein the grooves are inclined with respect to said side edges.

6. An arrangement according to claim 5, wherein said grooves are inclined with respect to a direction of movement of the endless plate band.

7. An arrangement according to claim 6, wherein said grooves are arranged so as to intersect one another at predetermined positions on the surface of the respective plate elements.

8. An arrangement according to claim 7, wherein points of intersection of said grooves are arranged substantially in a center of the middle area of each of the plate elements.

9. An arrangement according to claim 8, wherein each of said grooves has an approximately semi-circular cross-sectional configuration with opening areas of each of the grooves being rounded off.

10. An arrangement according to claim 8, wherein each of the plate elements includes spaced edges extending transversely to a direction of movement of the endless plate band, and wherein a plurality of recesses and projections are provided along each of the spaced edges, and wherein at least one further groove is arranged on each of said projections.

11. An arrangement according to claim 10, wherein each of said recesses includes a base portion and each of said projections includes a notched free end, and wherein said at least one further groove is arranged on the respective projections at a position nearer said base portion of the respective recesses than the notched free end of the projections.

12. An arrangement according to claim 11, wherein at least two further grooves are provided in each of said projections, said two further grooves being arranged so as to intersect at a predetermined position.

13. An arrangement according to claim 12, wherein points of intersection of the at least two further grooves are in a center area of an extension of the respective projections.

14. An arrangement according to claim 13, wherein said first-mentioned grooves subtend a first predetermined angle and said two further grooves on each of said projections subtend a second predetermined angle, and wherein said first and second predetermined angles are of different values.

15. An arrangement according to claim 14, wherein each of said first-mentioned grooves and said two further grooves has a depth which is at least half of a thickness of the respective plate elements.

16. An arrangement according to claim 14, wherein each of said first-mentioned grooves and said two further grooves has a depth which is at least one-fifth of a thickness of the respective plate elements.

17. An arrangement according to claim 8, wherein each of the grooves has an approximately U-shaped cross-sectional configuration with legs of the U-shaped groove being rounded off.

18. An arrangement according to claim 8, wherein each of the grooves has an approximately trapezoidal cross-sectional configuration.

19. An arrangement according to claim 4, wherein said grooves are arranged so as to intersect one another at predetermined positions on the surface of the respective plate elements.

20. An arrangement according to claim 19, wherein points of intersection of said grooves are arranged substantially in a center of the middle area of each of the plate elements.

21. An arrangement according to claim 20, wherein each of the plate elements includes spaced edges extending transversely to a direction of movement of the endless plate band, and wherein a plurality of recesses and projections are provided along each of the spaced edges, and wherein at least one further groove is arranged on each of said projections.

22. An arrangement according to claim 21, wherein each of said recesses includes a base portion and each of said projections includes a notched free end, and wherein said at least one further groove is arranged on the respective projections at a position nearer said base portion of the respective recesses than the notched free end of the projections.

23. An arrangement according to claim 22, wherein at least two further grooves are provided in each of said projections, said two further grooves being arranged so as to intersect at a predetermined position.

24. A press arrangement for the manufacture of chipboards, fiberboards and the like, the arrangement comprising: two endless plate bands arranged one above the other, said endless plate bands being mounted for revolution around polygonal rolls, each of said endless plate bands including a plurality of plate elements pivotally connected to each other, each of said plate elements including a plurality of recesses and projections arranged on edges thereof extending transversely to a direction of movement of the endless plate bands, pressure roll means for moving at least one of the endless plate bands, endless steel band means surrounding each of said endless plate bands, and means provided in a surface of each of said plate elements facing said pressure roll means for minimizing deformation of the plate elements during an operation of the press.

25. An arrangement according to claim 24, wherein each of the recesses and projections has one of a trapezoidal and triangular cross-sectional configuration.

26. An arrangement according to claim 25, wherein guide means are provided only in an area of side edges of the plate elements for pivotally connecting adjacent plate elements to each other.

27. An arrangement according to claim 26, wherein each projection has a free end at which is provided a notch, each of said recesses includes a base portion at which is arranged a further notch, and wherein said recesses and said projections are arranged such that, at an inlet area of the press and as viewed in a movement direction of the endless plate band, notches on the free ends of the projections of a following plate element engage with the notches arranged at the recesses of a preceding plate element.

28. An arrangement according to claim 27, wherein said means for minimizing deformation of the plate elements includes at least one groove provided in a surface of the respective plate elements facing the pressure roll means.

29. An arrangement according to claim 28, wherein a plurality of grooves are provided on each plate element, each of said grooves being arranged on the surface of each of said plate elements so as to extend substantially parallel to each other.

30. An arrangement according to claim 29, wherein the plate elements include spaced parallel side edges, and wherein the grooves are inclined with respect to said side edges.

31. An arrangement according to claim 30, wherein said grooves are inclined with respect to a direction of movement of the endless plate band.

32. An arrangement according to claim 31, wherein said grooves are arranged so as to intersect one another at predetermined positions on the surface of the respective plate elements.

33. An arrangement according to claim 32, wherein points of intersection of said grooves are arranged substantially in a center of the middle area of each of the plate elements.

34. An arrangement according to claim 33, wherein at least one further groove is arranged on each of said projections.

35. An arrangement according to claim 34, wherein said at least one further groove is arranged on the respective projections at a position nearer said base portion of the respective recesses than the free ends of the projections.

36. An arrangement according to claim 33, wherein at least two further grooves are provided in each of said projections, said two further grooves being arranged so as to intersect at a predetermined position.

* * * * *